United States Patent [19]

Jefferson

[11] Patent Number: 5,201,970
[45] Date of Patent: Apr. 13, 1993

[54] PNEUMATIC TIRES INCLUDING A CORRUGATED BELT STRUCTURE

[76] Inventor: Robert E. Jefferson, 11826 Cindlewick Rd. South, DeMotte, Ind. 46310

[21] Appl. No.: 771,725

[22] Filed: Oct. 4, 1991

Related U.S. Application Data

[63] Continuation-in-part of Ser. No. 398,002, Aug. 24, 1989, abandoned.

[51] Int. Cl.$^5$ .............................. B60C 9/18; B60C 9/20
[52] U.S. Cl. ........................................ 152/532; 152/526
[58] Field of Search ..................... 152/526, 532, 536

[56] References Cited

U.S. PATENT DOCUMENTS

| | | |
|---|---|---|
| 1,357,098 | 10/1920 | Kryder . |
| 3,133,583 | 5/1964 | Dobson . |
| 3,233,649 | 2/1966 | Jolivet . |
| 3,907,019 | 9/1973 | Montagne . |
| 3,960,628 | 6/1976 | Snyder . |
| 4,073,330 | 2/1978 | Allard . |
| 4,086,948 | 5/1978 | Suzuki . |
| 4,161,203 | 7/1979 | Suzuki . |
| 4,172,487 | 10/1979 | Suzuki . |
| 4,235,274 | 11/1980 | Suzuki . |
| 4,319,620 | 3/1982 | Knill . |
| 4,580,608 | 4/1986 | Rampl . |
| 4,699,194 | 10/1987 | Iuchi . |
| 4,739,811 | 4/1988 | Rampl . |
| 4,966,216 | 10/1990 | Kawasaki . |

FOREIGN PATENT DOCUMENTS

| | | | |
|---|---|---|---|
| 0166154 | 1/1986 | European Pat. Off. . | |
| 0317318 | 5/1989 | European Pat. Off. . | |
| 0409120 | 1/1991 | European Pat. Off. | 152/526 |
| 1290231 | 3/1962 | France . | |
| 1303287 | 7/1962 | France | 152/526 |
| 1407794 | 6/1965 | France . | |
| 1433298 | 2/1966 | France . | |
| 61-27706 | 2/1986 | Japan | 152/526 |
| WO8604862 | 8/1986 | World Int. Prop. O. . | |

Primary Examiner—Michael W. Ball
Assistant Examiner—Adrienne C. Johnstone
Attorney, Agent, or Firm—Juettner Pyle & Lloyd

[57] ABSTRACT

An improved belt structure, particularly suited to steel belted radial truck tires for highway use comprises providing at least one corrugated belt in combination with a flat belt and a hard rubber layer sandwiched therebetween. The corrugations comprise radially inward depending, circumferentially extending depressions in at least one belt. The depressions are radially aligned with the grooves in the tire tread, and thereby form arches to transfer stress away from the portion of the tread underlying the grooves to the solid portion of the tread between grooves. The improvement of the invention is believed to reduce or eliminate excessive wear and nipping of tread corner edges adjacent the tread grooves.

10 Claims, 1 Drawing Sheet

PNEUMATIC TIRES INCLUDING A CORRUGATED BELT STRUCTURE

This is a continuation-in-part of copending application Ser. No. 07/398,002 filed on Aug. 24, 1989 now abandoned.

BACKGROUND OF THE INVENTION

This invention relates to pneumatic tires for vehicles, and more particularly to belted tires. The invention is most applicable to steel belted, radial truck tires.

Steel belted radial truck tires which are subjected primarily to interstate highway driving conditions exhibit a particular tread wear pattern, wherein the edges of the tread adjacent the tread grooves are rapidly worn or nipped off. This rapid wearing or nipping reduces tread life and contributes to deposit of undesirably large quantities of synthetic rubber particles along the highways.

This rapid wear or nipping problem is believed to be caused by minor buckling in or deflection of the tire belt structure adjacent the tread grooves. The deflection causes the portion of the tread between grooves to twist, placing increased stress on the edged of the tread. The increased stress on the edge of the tread in turn causes the aforementioned rapid wear or nipping.

SUMMARY OF THE INVENTION

It is the object of the invention to provide an improved tire construction that reduces or eliminates the undesirable deflection or buckling of the belt structure of a belted tire adjacent the tread grooves, and accordingly reducing or eliminating the aforementioned rapid wear or nipping of the edge portions of the tire tread.

The object of the invention is achieved by reinforcing circumferential portions of at least one of the belts in the area underlying the tread grooves. In the preferred embodiment, the reinforcing is accomplished by providing a corrugated belt or ply in combination with a flat belt. Sandwiched in between the two belts is a hard rubber layer having ridges to form the corrugations of the corrugated belt. The rubber composition of the layer is sufficiently hard to maintain the shape of the corrugations when the tire is inflated and placed under load. The flat belt, hard rubber layer and corrugated belt are bonded together to form a transversely rigid belt structure. The flat belt anchors the corrugated belt, preventing the corrugated belt from stretching transversely, and thereby helps to maintain the shape of the corrugations.

The corrugated belt has radially inward depending, circumferentially extending depressions. The radially inward depressions of the corrugated belt are radially aligned with each tread groove. Accordingly, each depression acts as an arch to transfer stress from the area underlying the tire grooves to the tread blocks between grooves. It is believed that the foregoing corrugated belt structure will decrease or eliminate twisting of the tread portion between grooves, and will reduce rapid edge wear or nipping.

DETAILED DESCRIPTION

Figure 3:
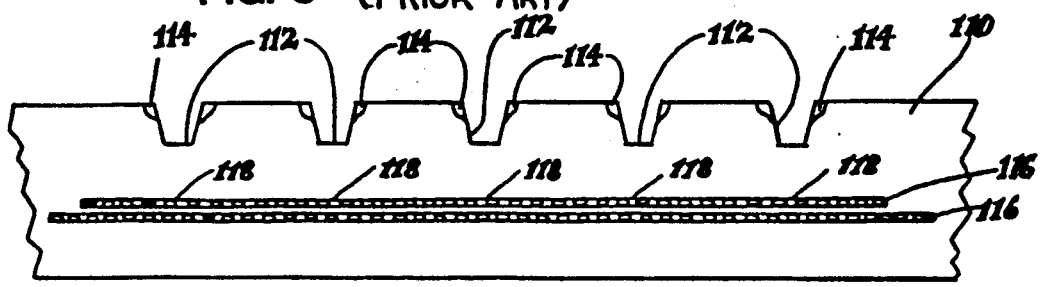
FIG. 3 is a diagrammatic cross-section detail of the tread portion of the tire, typical of the prior art, showing rapid wear or nipping of the edge portion of the tread adjacent the tread grooves.

Referring now to the drawings, FIG. 3 shows a diagrammatic detail of a typical truck tire tread 110. The tread 110 has grooves 112. The corner edges 114 of the tread adjacent the grooves are shown as having been subjected to rapid wear or nipping. The edge wear 114 is believed to be caused by deflections in the tread reinforcing belts or plies 116 in the area underlying the tread grooves 118. It is the object of the invention to reduce or eliminate this problem.

Figure 1:
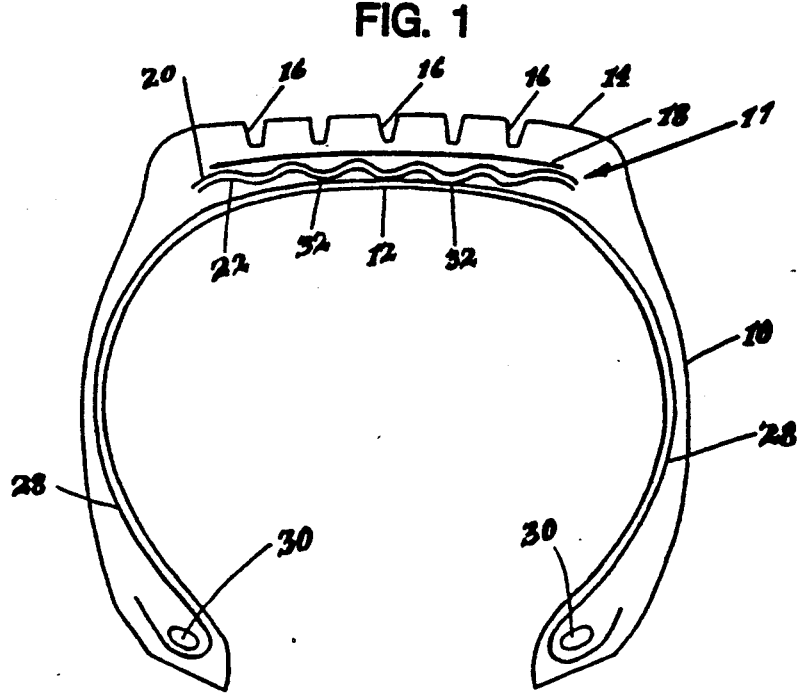
FIG. 1 is a diagrammatic cross-section through a belted pneumatic tire showing the corrugated belt structure according to the present invention.
Figure 2:
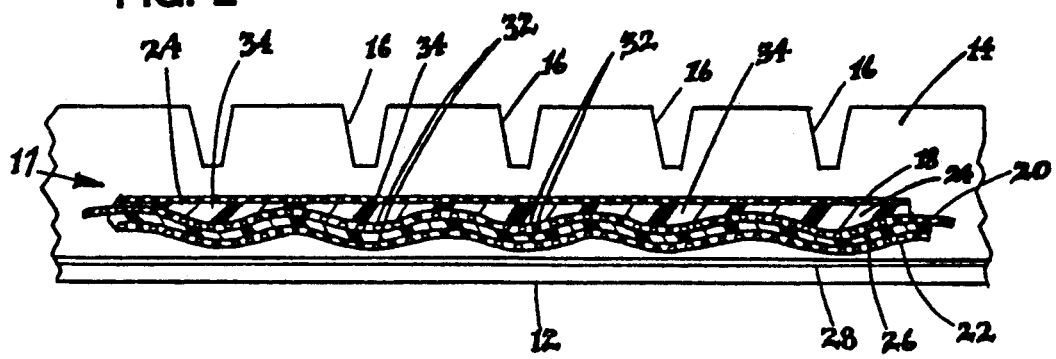
FIG. 2 is an enlarged cross-sectional detail of the crown region of the tire carcass, belt structure and tread of a belted pneumatic tire showing the belt structure according to the present invention.

FIGS. 1 and 2 illustrate the improved belt or ply structure of the present invention. A toroidal tire carcass 10 is shown having a crown region 12. Surrounding the carcass crown region is a tread 14. The tread 14 has a plurality of grooves 16 therein. Circumferentially disposed over the crown region 12, underlying the tread 14 is a belt structure 17. The belt structure comprises two or more belts. FIGS. 1 and 2 show three belts 18, 20 and 22. In between the belts, rubberized bonding layers 24 and 26 are provided. A radial ply 28 and beads 30 are shown for reference.

Turning now particularly to FIG. 2, the belt structure 17 of the invention comprises inner corrugated belts 20 and 22, outer flat belt 18 and a hard rubber layer 24 sandwiched therebetween. The corrugations comprise radially inward depending, circumferentially extending depressions 32 in the belts 20 and 22. Each depression 32 is radially aligned with a tread groove 16. The depressions form arches to transfer stress away from the area of the tread underlying the grooves 16 to the solid portion of the tread between grooves 16.

Different tread patterns incorporate tread grooves of varying widths. And, most tread patterns are not linear, but zigzag. Depending on the particular tread pattern desired, the centerline of each depression 32 should be radially aligned with the centerline of the corresponding groove 16. And, each depression 32 should be sufficiently wide to bridge the transverse dimension of the corresponding groove. The wider and deeper the groove, the transverse length and amplitude of the corrugation should be correspondingly larger.

The depressions 32 in belts 20 and 22 are formed by providing a hard rubber layer 24 with preformed ridges 34 depending radially inward and extending circumferentially of the carcass crown 12. Each ridge 34 corresponds in shape and location to the desired depressions 32 in belts 20 and 22. In order to maintain the arch-like shape of depressions 32 when the tire is inflated and subjected to load, it is necessary to utilize a hard rubber composition for at least the ridge portions 34, and preferably all of layer 24. Hard rubber may be defined as having a Shore A hardness of 67 or higher at room temperature. In contrast, soft rubber may be defined as having Shore A hardness in the range of 20 to 60. It is believed that a Shore A hardness in the range of 80 to 85 or greater at room temperature or warmer would be preferred for layer 24.

It is also important that the corrugated belts 20 and 22, flat belt 18 and hard rubber layer 24 be firmly bonded together into a transversely rigid assembly. It is necessary that the corrugated belts be anchored to the flat belt to prevent the corrugated belts from stretching in the transverse direction. Stretching the corrugated belts transversely would result in the flattening of the corrugations, and would thereby reduce the effectiveness of the desired stress transferring function of the belt structure of the invention. Accordingly, the rubber composition of layer 24 should have a high shear strength in addition to having high hardness.

Although the flat belt 18 may be positioned on either side of the corrugated belts 20 and 22, it is preferred that flat belt 18 be located on the outer or tread side of the belt structure 17. Furthermore, flat belt 18 should be spaced inwardly from the bottom of tread grooves 16. It is the purpose, therefore, to locate the belt structure 17 of the invention beneath, not within, the tread 14 of the tire.

Although three belts have been shown in the drawings, two corrugated, one not, it is to be understood that in accordance with the present invention, only one corrugated belt and one flat belt are required. For different tread designs and for higher load ranges, it may well be desirable to provide plural flat belts and plural corrugated belts.

FIGS. 1 and 2 show five tread grooves 16 and five corresponding depressions 32. A different number of grooves and corresponding depressions are contemplated by the present invention. It is also within the contemplation of the invention to provide depressions underlying some, but not all of the tread grooves. The edge wear or nipping conditions discussed above are move prevalent on the outer tread grooves than the inner grooves. Nipping also appears to be more prevalent at relatively wider grooves, than at narrow grooves. Accordingly, within the scope of the present invention, one may omit providing depressions underlying inner, narrow grooves.

While the preferred embodiment of the present invention has been shown and described, it is to be understood that various modifications and changes could be made thereto without departing from the scope of the appended claims.

What is claimed is:

1. In a belted pneumatic tire having a toroidal carcass, a tread surrounding the crown region of said carcass, said tread having a plurality of grooves extending substantially circumferentially, said tire having an improved reinforcing belt structure comprising a flat belt extending circumferentially between said tread and said carcass; a corrugated belt extending circumferentially juxtaposed to said flat belt, said corrugated belt having at least one inwardly depending depression, each said depression being radially aligned with a respective one of said grooves; and a hard rubber layer sandwiched between said flat belt and said corrugated belt, said flat belt, said corrugated belt and said hard rubber layer bonded together into a substantially transversely rigid belt structure.

2. A belted pneumatic tire as in claim 1, wherein said flat belt is radially inward from said tread and said corrugated belt is radially inward from said flat belt.

3. A belted pneumatic tire as in claim 2, wherein said hard rubber layer has at least one circumferentially extending, radially inward depending ridge, each said ridge received in each respective said depression in said corrugated belt.

4. A belted pneumatic tire as in claim 1, wherein there is the same number of said depressions as said circumferential grooves in said tread, and each said depression is substantially radially aligned with a respective one of said grooves.

5. A belted pneumatic tire as in claim 1, wherein said hard rubber layer has a Shore A hardness of 67 or greater at room temperature.

6. A belted pneumatic tire as in claim 1, wherein said hard rubber layer has a Shore A hardness of between about 80 and 85 at room temperature or warmer.

7. A belted pneumatic tire as in claim 1, further comprising a second corrugated belt extending circumferentially juxtaposed to said corrugated belt, said second corrugated belt having at least one inwardly depending depression, said depression of said corrugated belt and said second corrugated belt being in radial alignment with each other and a respective one of said grooves in said tread.

8. In a belted pneumatic tire having a toroidal carcass, a tread surrounding the crown region of said carcass, said tread having a plurality of grooves extending substantially circumferentially, said tire having an improved reinforcing belt structure comprising an inner circumferentially extending belt between said tread and said carcass; an outer circumferentially extending belt between said inner belt and said tread, said outer belt being substantially flat; and a hard rubber layer sandwiched between said inner belt and said outer belt, said hard rubber layer having a plurality of circumferentially extending, inwardly depending ridges, each said ridge being substantially radially aligned with a respective one of said grooves in said tread, said ridges forming radially depending depressions in said inner belt; and means for bonding said inner and outer belts and said hard rubber layer into a substantially transversely rigid assembly.

9. A belted pneumatic tire as in claim 1, wherein said hard rubber layer has a Shore A hardness of 80 or greater at room temperature.

10. In a belted pneumatic tire having a toroidal carcass, a tread surrounding the crown region of said carcass, said tread having a plurality of grooves extending substantially circumferentially, said tire having an improved reinforcing belt structure comprising an outer circumferentially extending belt radially inward from and underlying said tread, said outer belt being substantially flat; a rubber layer radially inward from and underlying said outer belt, said rubber layer having on its inner side a plurality of circumferentially extending, radially inward depending ridges, each said ridge being substantially radially aligned with a respective one of said grooves in said tread, said ridges having a Shore A hardness of 80 or greater at room temperature or warmer; an inner belt radially inward from and underlying said rubber layer, said inner belt having a plurality of radially depending depressions, each said depression receiving a respective one of said ridges of said rubber layer; and means for bonding said inner and outer belts and said rubber layer into a substantially transversely rigid assembly.

* * * * *